United States Patent [19]

Gentry et al.

[11] Patent Number: 4,516,406
[45] Date of Patent: May 14, 1985

[54] COOLING SYSTEM FOR MOTOR VEHICLES

[75] Inventors: Samuel H. Gentry, Chula Vista, Calif.; Frank Gentry, Rogersville, Tenn.

[73] Assignee: Gentry and Green Enterprises, San Diego, Calif.

[21] Appl. No.: 468,077

[22] Filed: Feb. 22, 1983

[51] Int. Cl.³ .............................................. F25B 39/04
[52] U.S. Cl. .................................. 62/183; 62/323.1; 62/513
[58] Field of Search .................. 62/183, 323.1, 428, 62/513; 165/42

[56] References Cited

U.S. PATENT DOCUMENTS

| | | | |
|---|---|---|---|
| 1,986,863 | 1/1935 | Terry | 62/183 X |
| 2,438,120 | 3/1948 | Freygang | 62/183 X |
| 2,530,681 | 11/1950 | Clancy | 62/513 X |
| 2,747,383 | 5/1956 | Schlumbohm | 62/428 X |
| 3,105,366 | 10/1963 | Atchison | 62/428 X |
| 3,203,476 | 8/1965 | McMahan | 165/42 |
| 3,926,000 | 12/1975 | Scofield | 62/323.1 X |

*Primary Examiner*—William E. Tapolcai
*Attorney, Agent, or Firm*—Baker, Maxham, Callan & Jester

[57] ABSTRACT

A cooling system for use with an engine driven vehicle having an air conditioning system to cool the air conditioning condenser and vehicle engine. The cooling system is connected to the evaporator plenum chamber of the air conditioning system and a blower passes cool air from the evaporator plenum chamber to cooling pipes positioned adjacent the air conditioning condenser. A control turns the system on and off and controls the volume of cool air passing through the system. In the version used with a liquid cooled engine, the cooling pipes are positioned in front of the radiator.

18 Claims, 3 Drawing Figures

COOLING SYSTEM FOR MOTOR VEHICLES

BACKGROUND

The present invention relates to a cooling system for use in a motor vehicle having an air conditioning system.

The air conditioning system in a motor vehicle includes a compressor driven by the vehicle engine wherein the refrigerant is compressed. The compressed refrigerant is passed to an evaporation chamber inside the motor vehicle and the expanding refrigerant absorbs heat from inside the vehicle causing the vehicle interior to be cooled. The evaporated refrigerant is cooled and passed back into the condenser. When the air conditioner in the vehicle is used in extremely hot temperatures, such as found in the desert for example, the engine overheats. The overheating is caused by the hot refrigerant in the condensing unit that is normally located in front of the vehicle radiator. When the outside air that is being pulled across the condensing coils of the condenser is in the middle and high ninety degrees Farenheit, the compressor head pressure soars, causing the refrigerant to become even hotter and greatly reducing its ability to transfer heat which was absorbed while circulating through the evaporator of the air conditioning system.

In places like Las Vegas, Nev., signs are prevalent cautioning people to turn off their air conditioners and avoid overheating. Campers, motor homes, and other such vehicles have serious overheating problems, particularly when they are climbing a grade during which condition there is an additional tendency for the engine to overheat.

SUMMARY

The vehicle cooling system of the present invention overcomes the prior art deficiencies with means for transferring cold air from the evaporator section of the vehicle air conditioning system to cooling means adjacent the condenser section, thus cooling the refrigerant in the condensing section and also cooling the vehicle engine.

DESCRIPTION OF THE INVENTION

Figure 1:
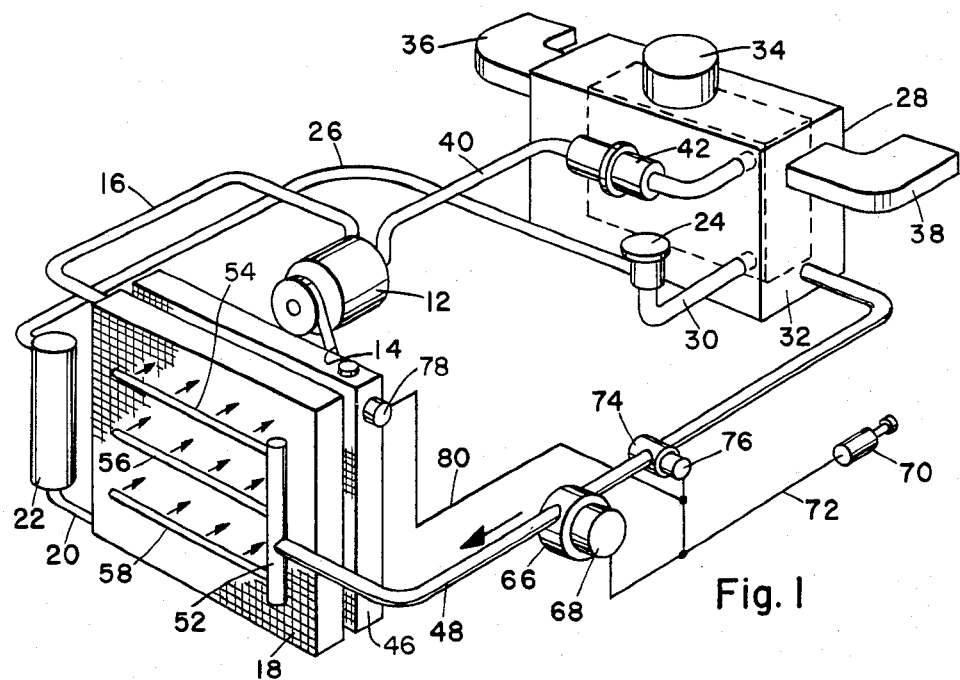
FIG. 1 is a schematic view of a typical air conditioning system with the add-on cooling system of the present invention installed.
Figure 2:
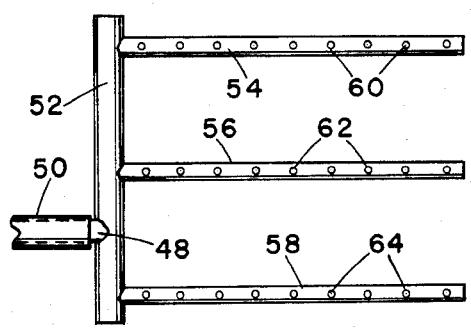
FIG. 2 is a rear view of the cold air distribution manifold.
Figure 3:
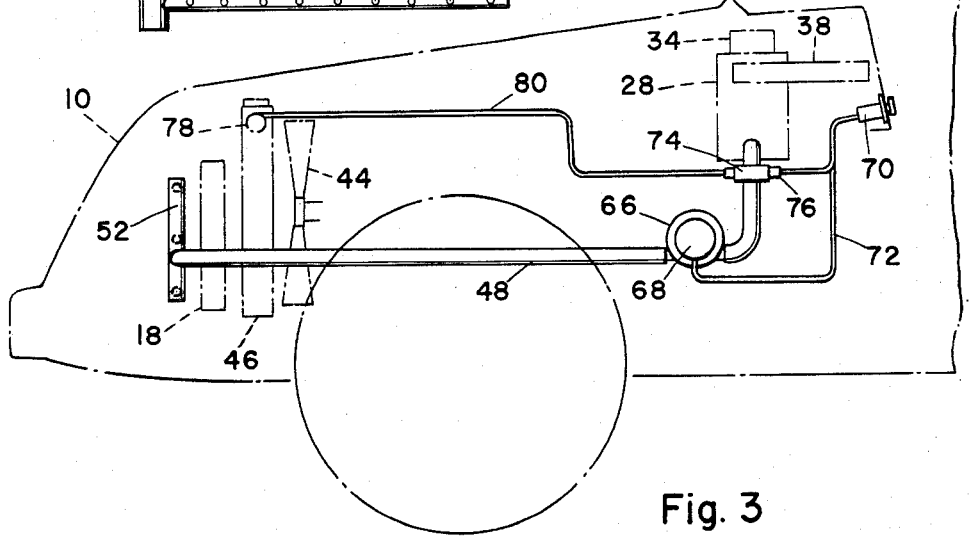
FIG. 3 illustrates the installation of a cooling system of the present invention in a vehicle, the add-on cooling system being indicated in full line for clarity and related portions of the vehicle being shown in broken line.

An automobile is partially shown in phantom line at 10 in FIG. 3 of the drawings. The vehicle has a typical air conditioning system as shown in FIGS. 1 and 3. The air conditioning system includes an engine driven compressor 12 driven by the belt 14. The compressor compresses refrigerant in the system and passes it through line 16 to the condenser 18. The condensed refrigerant passes through line 20 to the dryer 22 and from the dryer 22 to the expansion valve 24 in line 26. The refrigerant then passes from the expansion valve 24 into the evaporator 28 through the line 30. The condensed refrigerant expands in the evaporator 28 and cools the air in the plenum chamber 32.

The cool air in the plenum chamber 32 is passed to the interior of the vehicle 10 to cool the passengers by the blower 34 through the air outlets 36 and 38. The expanded refrigerant is moved to the inlet of the compressor 12 through line 40 and coupling 42 to complete the normal air conditioning circuit. The engine driven cooling fan 44 and radiator 46 of the vehicle 10 are shown in FIG. 3 of the drawings. The cooling system of the present invention comprises an arrangement for passing the cold air from the evaporator plenum chamber to a position adjacent the vehicle radiator and the air conditioning condenser. A line 48 covered with insulation 50 extends from the plenum chamber 32 to a cooling manifold 52. The manifold 52 includes three laterally extending arms 54, 56 and 58 that are closed on the ends and contain respective openings 60, 62 and 64.

A blower 66 driven by an electric motor 68 is mounted in the line 48 to move some of the cold air from the plenum chamber 32 to the manifold 52 and out through the openings 60, 62 and 64 toward the condenser 18. This action cools the condenser 18 and aids in the cooling of the radiator 46. The electric motor 68 is connected to the control 70 by the electric line 72. Also positioned in the line 48 is a flapper valve 74 which controls the passage of air in the line. This valve is controlled by solenoid 76 that is connected via the electric line 72 to the control 70. The solenoid 76 can open the flapper valve 74 wider as more cool air is needed. A thermostat 78 is placed at the inlet of the radiator 46 and senses the temperature of the engine coolant. When the coolant reaches a predetermined temperature, the thermostat 78 actuates the solenoid 76 via the electric line 80 to control the opening of the flapper valve 74.

The present invention provides a simple and dependable construction for cooling the air conditioning condenser and the engine. The cold air provided across the air conditioning condenser reduces the condenser head pressure and keeps the air conditioning system working effectively even in hot climates. The reduced head pressure in the condenser provides a reduced load on the engine that drives the compressor and the compressor runs cooler, and with reduced head pressure. The system does not depend on the ambient air, which may be very hot, to cool the condenser and the radiator. The cold air also reduces the temperature in the coolant being circulated through the engine radiator.

In the event the vehicle has an air cooled engine, the cooling arms 54, 56 and 58 pass the cold air over the air conditioner condensing unit as with the liquid cooled engine. The cold air cools the condensing unit which in turn drops the head pressure on the air conditioner compressor, thereby cooling the engine and reducing fuel consumption. No radiator exists. However, the cooling arms can be located in the air stream of the cooling fan the same as with the liquid cooled engine if desired.

Having thus described our invention, we claim:

1. A cooling system for a motor vehicle having an engine and also having an air conditioner that includes an evaporator in a plenum chamber and a condenser, comprising:

conduit means connected at one end with said plenum chamber;

cooled air dispersing means connected to the other end of said conduit means adjacent said condenser for automatically, selectively passing a portion of the cooled air from said plenum chamber over said condenser; and means responsive to the engine temperature for controlling the amount of cooled air passing from said plenum chamber to said cooled air dispersing means, the amount of cooled air flowing through said conduit means selectively ranging from zero to the capacity of said conduit means, based on demand;

whereby the refrigerant in the condenser is cooled, thereby reducing the tendency of the vehicle engine to overheat.

2. A cooling system for a motor vehicle according to claim 1 wherein blower means is positioned in communication with said conduit means for passing the cooled air from the evaporator to said cooled air dispersing means; and said controlling means controls said blower means.

3. A cooling system for a motor vehicle according to claim 2 wherein said controlling means comprises adjusting means positioned in said conduit means for adjusting the amount of cool air flowing from said plenum chamber through said conduit means to said cooled air dispensing means.

4. A cooling system for a motor vehicle according to claim 3 including means for controlling the position of the adjusting means.

5. A cooling system for a motor vehicle according to claim 4 wherein the engine has a liquid cooling system with a radiator and the adjusting means is controlled in accordance with the temperature of the coolant in the engine cooling system.

6. A cooling system for a motor vehicle according to claim 1 wherein said cooled air dispersing means comprises a plurality of elements having openings therein facing toward said compressor for passing cool air toward said compressor.

7. A cooling system for a motor vehicle according to claim 5 wherein the cooling means includes a plurality of elements having openings therein facing toward the compressor and radiator.

8. A cooling system for a motor vehicle according to claim 1 wherein said cooled air dispersing means is positioned in front of said condenser and radiator.

9. A cooling system for a motor vehicle according to claim 5 wherein the cooling means is positioned in front of said condenser and radiator.

10. A cooling system for a motor vehicle according to claim 8 wherein said cooled air dispersing means includes a plurality of elements having openings therein facing the condenser.

11. A cooling system for a motor vehicle according to claim 9 wherein said cooled air dispersing means includes a plurality of elements having openings therein facing the condenser and radiator.

12. A cooling system for a motor vehicle having an engine and a radiator with coolant therein, and also having an air conditioner that includes an evaporator in a plenum chamber and a condenser, comprising:

conduit means connected at one end with said plenum chamber;

a plurality of cooled air dispersing elements connected to the other end of said conduit means and positioned in front of said radiator and condenser, said elements having openings facing said radiator and condenser for passing a portion of the cooled air from said plenum chamber over said radiator and condenser;

blower means in communication with said conduit means for passing cooled air through said conduit means; and means responsive to the temperature of the engine coolant for controlling the amount of cooled air passing from said plenum chamber to said cooled air dispersing means;

said controlling means comprising adjusting means in said conduit means for adjusting the amount of cooled air flowing in said conduit means and controlled by said controlling means.

13. A cooling system for a motor vehicle having an engine and also having an air conditioner that includes an evaporator in a plenum chamber and a condenser, said cooling system comprising:

conduit means connected at one end with said plenum chamber;

cooled air dispersing means connected to the other end of said conduit means adjacent said condenser for automatically, selectively passing a portion of the cooled air from said plenum chamber over said condenser:

blower means positioned in communication with said conduit means for passing the cooled air from said evaporator to said cooled air dispersing means;

means for controlling said blower means;

adjusting means positioned in said conduit means for adjusting the amount of cooled air flowing from said plenum chamber through said conduit means to said cooled air dispersing means, the amount of cooled air flowing through said conduit means selectively ranging from zero to the capacity of said conduit means, based on demand; and means responsive to the engine temperature for controlling the position of said adjusting means and thereby control the flow of cooled air through said conduit means;

whereby the refrigerant in said condenser is cooled, thereby reducing the tendency of the vehicle to overheat.

14. A cooling system for a motor vehicle according to claim 13 wherein the engine has a liquid cooling system with a radiator, said adjusting means being controlled in accordance with the temperature of the coolant in the engine cooling system.

15. A cooling system for a motor vehicle according to claim 14 wherein said cooled air dispersing means comprises a plurality of elements having openings therein facing toward the compressor and radiator.

16. A cooling system for a motor vehicle according to claim 14 wherein said cooled air dispersing means is positioned in front of said condenser and radiator.

17. A cooling system for a motor vehicle according to claim 16 wherein said cooled air dispersing means includes a plurality of elements having openings therein facing said condenser and radiator.

18. A cooling system for a motor vehicle having an engine and a radiator with coolant therein, and also having an air conditioner that includes an evaporator in a plenum chamber and a condenser, said cooling system comprising:

conduit means connected at one end with said plenum chamber;

a plurality of cooled air dispersing elements connected to the other end of said conduit means and positioned in front of said condenser and radiator, said elements having openings facing said condenser and radiator for passing cooled air from said plenum chamber over said condenser and radiator;

blower means in communication with said conduit means for passing cooled air through said conduit means and controlled by control means; and adjusting means in said conduit means for adjusting the amount of cooled air flowing in said conduit means and controlled by said control means;

whereby said adjusting means is controlled in accordance with the temperature of the coolant in the engine cooling system.

* * * * *